(12) United States Patent
West et al.

(10) Patent No.: US 10,146,521 B2
(45) Date of Patent: Dec. 4, 2018

(54) DEVICE, SYSTEM AND METHOD FOR UPDATING THE SOFTWARE MODULES OF A VEHICLE

(71) Applicant: AIRPRO DIAGNOSTICS, LLC, Jacksonville, FL (US)

(72) Inventors: Scotty West, Sunrise, FL (US); Steve Casella, Sunrise, FL (US)

(73) Assignee: AirPro Diagnostics, LLC, Jacksonville, FL (US)

( * ) Notice: Subject to any disclaimer, the term of this patent is extended or adjusted under 35 U.S.C. 154(b) by 0 days.

(21) Appl. No.: 14/849,084

(22) Filed: Sep. 9, 2015

(65) Prior Publication Data

US 2016/0070559 A1   Mar. 10, 2016

Related U.S. Application Data

(60) Provisional application No. 62/047,997, filed on Sep. 9, 2014.

(51) Int. Cl.
*G06F 8/65* (2018.01)
*G07C 5/00* (2006.01)

(52) U.S. Cl.
CPC ............. *G06F 8/65* (2013.01); *G07C 5/008* (2013.01); *G07C 2205/02* (2013.01)

(58) Field of Classification Search
CPC .. G06F 8/60–8/68; G06F 8/665; G07C 5/008; G07C 2205/02
USPC .................................................. 717/168–178
See application file for complete search history.

(56) References Cited

U.S. PATENT DOCUMENTS

| | | |
|---|---|---|
| 5,491,418 A | 2/1996 | Alfaro et al. |
| 6,611,739 B1 | 8/2003 | Harvey et al. |
| 6,677,854 B2 | 1/2004 | Dix |
| 6,728,603 B2 | 4/2004 | Pruzan et al. |
| 6,807,469 B2 | 10/2004 | Funkhouser et al. |
| 6,928,349 B1 | 8/2005 | Namaky et al. |
| 6,956,501 B2 | 10/2005 | Kitson |
| 7,209,817 B2 | 4/2007 | Abdel-Malek et al. |
| 7,366,589 B2 * | 4/2008 | Habermas ................. G06F 8/65 701/1 |
| 7,373,226 B1 | 5/2008 | Cancilla et al. |
| 7,487,018 B2 | 2/2009 | Afshar et al. |
| 7,502,672 B1 | 3/2009 | Kolls |
| 7,519,458 B2 | 4/2009 | Buckley |
| 7,532,962 B1 | 5/2009 | Lowrey et al. |
| 7,584,030 B1 | 9/2009 | Graham |

(Continued)

FOREIGN PATENT DOCUMENTS

KR    20020027758 A    4/2002

*Primary Examiner* — Marina Lee
(74) *Attorney, Agent, or Firm* — Laurence A. Greenberg; Werner H. Stemer; Ralph E. Locher

(57) ABSTRACT

A device, system and method for updating the software modules of a vehicle is provided. The device includes an interface device local to a vehicle that communicates with a remote third party location or customer service center. A database of OEM vehicle software modules is accessed by the third party, customer service center and at least one software module particular to the vehicle is provided to the interface device. The interface device is configured to program, reprogram and/or update at least one vehicle software module of the particular vehicle with the software module via the reprogramming tool.

14 Claims, 3 Drawing Sheets

(56) References Cited

U.S. PATENT DOCUMENTS

| | | | |
|---|---|---|---|
| 7,620,484 B1* | 11/2009 | Chen | G06Q 20/102 701/31.5 |
| 7,835,691 B2 | 11/2010 | Groskreutz et al. | |
| 8,145,379 B2 | 3/2012 | Schwinke | |
| 8,498,771 B2* | 7/2013 | Dwan | G07C 5/008 701/29.1 |
| 8,630,765 B2 | 1/2014 | Chen | |
| 8,688,313 B2* | 4/2014 | Margol | G06F 8/61 701/31.4 |
| 8,769,038 B2 | 7/2014 | Montoya | |
| 8,886,351 B2* | 11/2014 | Xavier | B62D 65/02 700/109 |
| 8,897,952 B1* | 11/2014 | Palmer | G07C 5/008 701/29.1 |
| 9,002,554 B2 | 4/2015 | Chen | |
| 9,232,433 B2* | 1/2016 | Subramanian | H04L 1/0009 |
| 9,436,456 B2* | 9/2016 | Danne | G06F 8/665 |
| 2005/0038581 A1 | 2/2005 | Kapolka et al. | |
| 2005/0065678 A1 | 3/2005 | Smith et al. | |
| 2005/0251304 A1 | 11/2005 | Cancellara et al. | |
| 2005/0256614 A1* | 11/2005 | Habermas | G06F 8/65 701/1 |
| 2006/0041337 A1 | 2/2006 | Augsburger et al. | |
| 2006/0101311 A1 | 5/2006 | Lipscomb et al. | |
| 2006/0106508 A1 | 5/2006 | Liebl et al. | |
| 2006/0202862 A1 | 9/2006 | Ratnakar | |
| 2006/0217855 A1 | 9/2006 | Chinnadurai et al. | |
| 2007/0005201 A1 | 1/2007 | Chenn | |
| 2007/0043488 A1 | 2/2007 | Avery et al. | |
| 2007/0118256 A1 | 5/2007 | Chigusa | |
| 2007/0185624 A1 | 8/2007 | Duddles et al. | |
| 2007/0198147 A1 | 8/2007 | Keith et al. | |
| 2008/0161989 A1 | 7/2008 | Breed | |
| 2008/0177438 A1 | 7/2008 | Chen et al. | |
| 2008/0280602 A1 | 11/2008 | Ban | |
| 2009/0259358 A1 | 10/2009 | Andreasen | |
| 2009/0265055 A1 | 10/2009 | Gillies | |
| 2009/0326757 A1 | 12/2009 | Andreasen et al. | |
| 2010/0174446 A1 | 7/2010 | Andreasen et al. | |
| 2010/0262335 A1 | 10/2010 | Brozovich | |
| 2011/0071725 A1* | 3/2011 | Kleve | G07C 5/008 701/31.4 |
| 2011/0106374 A1* | 5/2011 | Margol | G06F 8/61 701/31.4 |
| 2011/0276218 A1* | 11/2011 | Dwan | G07C 5/008 701/29.5 |
| 2011/0313593 A1 | 12/2011 | Cohen et al. | |
| 2011/0320089 A1* | 12/2011 | Lewis | G01C 21/32 701/29.6 |
| 2012/0029762 A1* | 2/2012 | Ubik | G07C 5/008 701/29.6 |
| 2012/0046826 A1 | 2/2012 | Panko | |
| 2012/0191449 A1* | 7/2012 | Lloyd | H04M 1/04 704/231 |
| 2013/0246135 A1 | 9/2013 | Wang | |
| 2013/0317668 A1* | 11/2013 | Tarnutzer | H04L 12/40006 701/2 |
| 2014/0052330 A1* | 2/2014 | Mitchell | G06F 8/65 701/31.5 |
| 2014/0075356 A1 | 3/2014 | Gray et al. | |
| 2014/0256304 A1 | 9/2014 | Frye et al. | |
| 2015/0100197 A1* | 4/2015 | Peirce | H04W 12/08 701/31.5 |
| 2015/0181460 A1 | 6/2015 | Subramanian | H04L 1/0009 370/230 |
| 2015/0301821 A1* | 10/2015 | Danne | H04L 67/06 717/169 |
| 2016/0066004 A1* | 3/2016 | Lieu | H04N 21/2541 725/29 |
| 2016/0070559 A1* | 3/2016 | West | G06F 8/65 717/172 |

\* cited by examiner

DEVICE, SYSTEM AND METHOD FOR UPDATING THE SOFTWARE MODULES OF A VEHICLE

CROSS-REFERENCE TO RELATED APPLICATIONS

The present application claims benefit of Provisional Patent Application No. 62/047,997, filed on Sep. 9, 2014; that application being incorporated herein, by reference, in its entirety.

BACKGROUND OF THE INVENTION

Field of the Invention

The invention relates to a device, system and method for updating the software modules of a vehicle and, more particularly, to a device, system and method including an interface device local to the vehicle that communicates with a remote third party location or customer service center to provide the interface device with OEM software from a variety of different makes of vehicle with which to update the vehicle software modules.

Description of the Related Art

At the turn of the century the EPA and CARB noticed that many vehicles on the road were not meeting emissions standards because of old calibrations. The SAE J2534 standard was developed to address this problem. SAE J2534 is a standard for communications between a computer and a vehicle. Government regulations require all automakers provide a J2534 service to everyone in the U.S. for re-flashing emissions related controllers. In recent years the EPA, CARB, and European Union have required automotive companies to allow for emissions-related modules (ECM/TCM) to be reprogrammable without use of special and often very expensive factory tools, in an effort to reduce harmful emissions. U.S. Pat. No. 8,638,207 to Drew, et al. (incorporated by reference, herein), discloses a vehicle computer interface and software upgrade tool for re-flashing a vehicle computer. The '207 patent, discloses a system that is "unique in that it allows the technician to add or subtract modules any time they want without doing anything more than attaching the new module to the existing modules in the same manner that Legos® are attached to each other". See, for example, col. 8 of the '207 patent, lines 11-17. Additionally, the '207 patent discloses that information can be transferred between the modules and a personal computer, and that "a software upgrade for a vehicle could be downloaded from a vehicle manufacture's Website to the laptop computer over the Internet". See, for example, col. 5 of the '207 patent, lines 44-52.

What is needed is a system, device and method for updating vehicle computer software without requiring the purchase of multiple hardware modules to be plugged into the updating tool, in order to perform the update. What is additionally needed is a one stop shopping solution that provides OEM software updates for a plurality of vehicle manufacturers, without requiring the user to access, and subscribe to, multiple vehicle manufacturer's Websites.

U.S. Pat. No. 8,688,313 to Margol et al., discloses a system and method for remotely programming a vehicle by way of the vehicle's OBD connector. More particularly, the '313 patent contemplates a bi-directional communication system that is adapted to transmit the vehicle signals present on pins across a computer network for remote data analysis and manipulation, and to permit remote programming of the subject vehicle's sub systems. See, for example, col. 7 of the '313 patent, lines 7-11. In the '313 patent, this bi-directional communication link between the vehicle and the remote location allows a technician at the remote location to program a vehicle via a scan tool or computing system, as if he were standing proximate to the vehicle. See, for example, col. 7 of the '313 patent, lines 11-16. To this end, the vehicle communication device receives vehicle signals present on pins of a vehicle connector, convert the vehicle signals to a network-compatible data packet and relay the data packet to the remote communication device over the bi-directional link. The remote communication device is configured to request and receive the vehicle packet and convert it back to vehicle-compatible signals, which are processed and analyzed by a scan tool in communication with the remote communication device through an OBD connection, as if the scan toll were directly connected to the vehicle communication device. See, for example, col. 9 of the '313 patent, lines 30-41. Vehicle-compatible programming signals are then converted to network-compatible data packets and relayed from the remote communication device to the vehicle communication device, which re-converts the programming packet to vehicle compatible (pin compatible) programming signals. See, for example, col. 9 of the '313 patent, lines 49-61. The '313 patent does not remotely program the reprogramming tool, rather, in the '313 patent, "vehicle packets and programming packets can be exchanged between the vehicle and the remote location, in either direction, to enable remote analysis and programming of the vehicle". See, for example, col. 9 of the '313 patent, lines 58-61.

What is needed is a system that does not program the vehicle remotely, but rather, remotely downloads OEM software from a variety of manufacturers to a device that is local to the vehicle, so that the local reprogramming tool can be used to reprogram a variety of vehicles of different makes.

BRIEF SUMMARY OF THE INVENTION

It is accordingly an object of the invention to provide a device, system and method for updating vehicle software modules that satisfies the needs of the prior art. In one particular embodiment of the invention, a J2534 programming tool is reprogrammed, on the fly, for operation with a particular vehicle local to the J2534 programming tool. In one embodiment, at least one software module is provided by a first location to the J2534 programming tool at a second location remote from the first location based on information received at the first location identifying the particular vehicle at the second location. In one embodiment, the at least one software module is selected from a plurality of software modules of a plurality of different vehicle manufacturers to, upon execution on the J2534 programming tool, reprogram the J2534 programming tool for operation with the particular vehicle at the second location.

Although the invention is illustrated and described herein as embodied in a device, system and method for updating the software modules of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
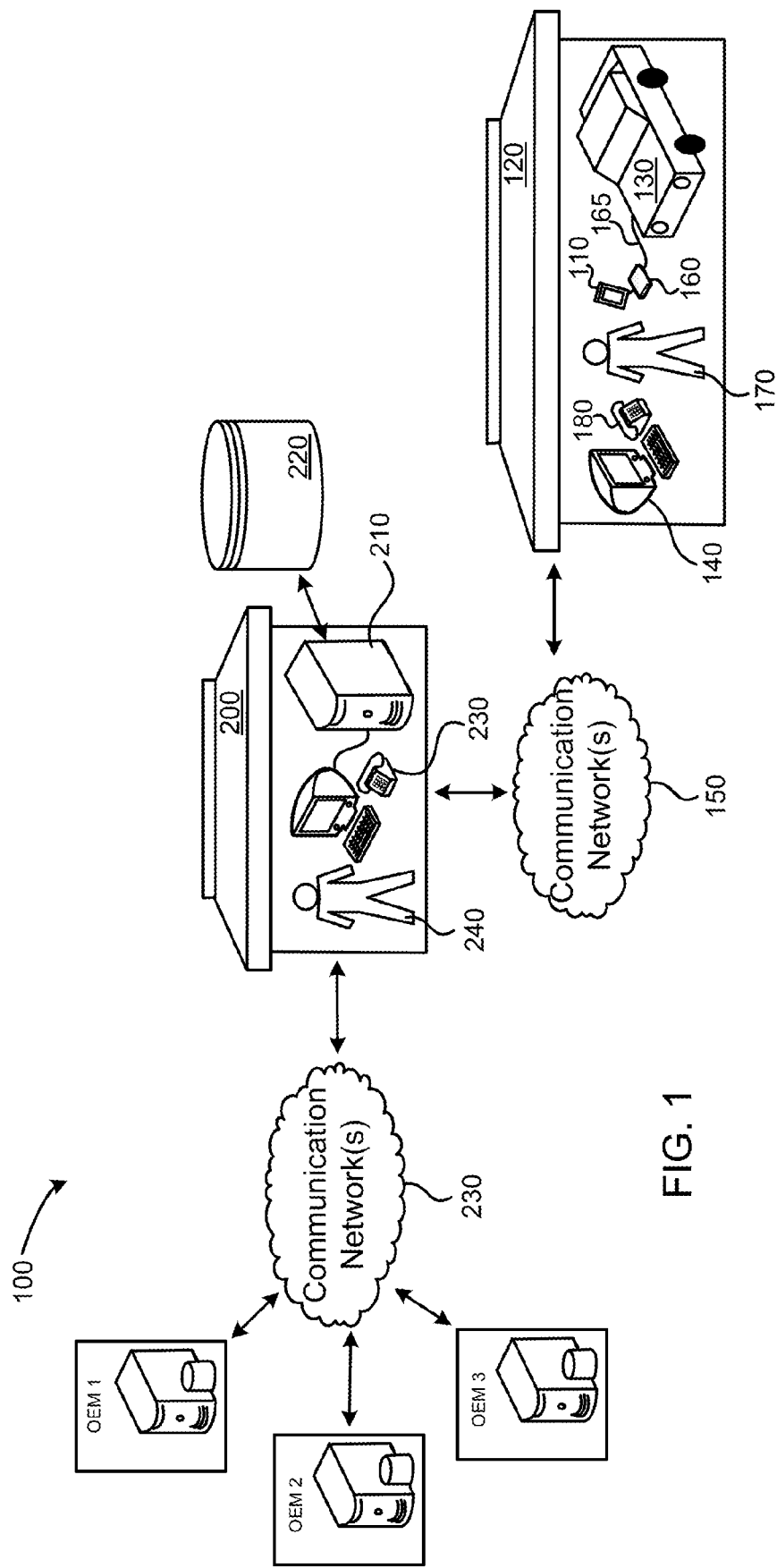
FIG. 1 is a simplified block diagram of a system in accordance with one particular embodiment of the invention.
Figure 2:
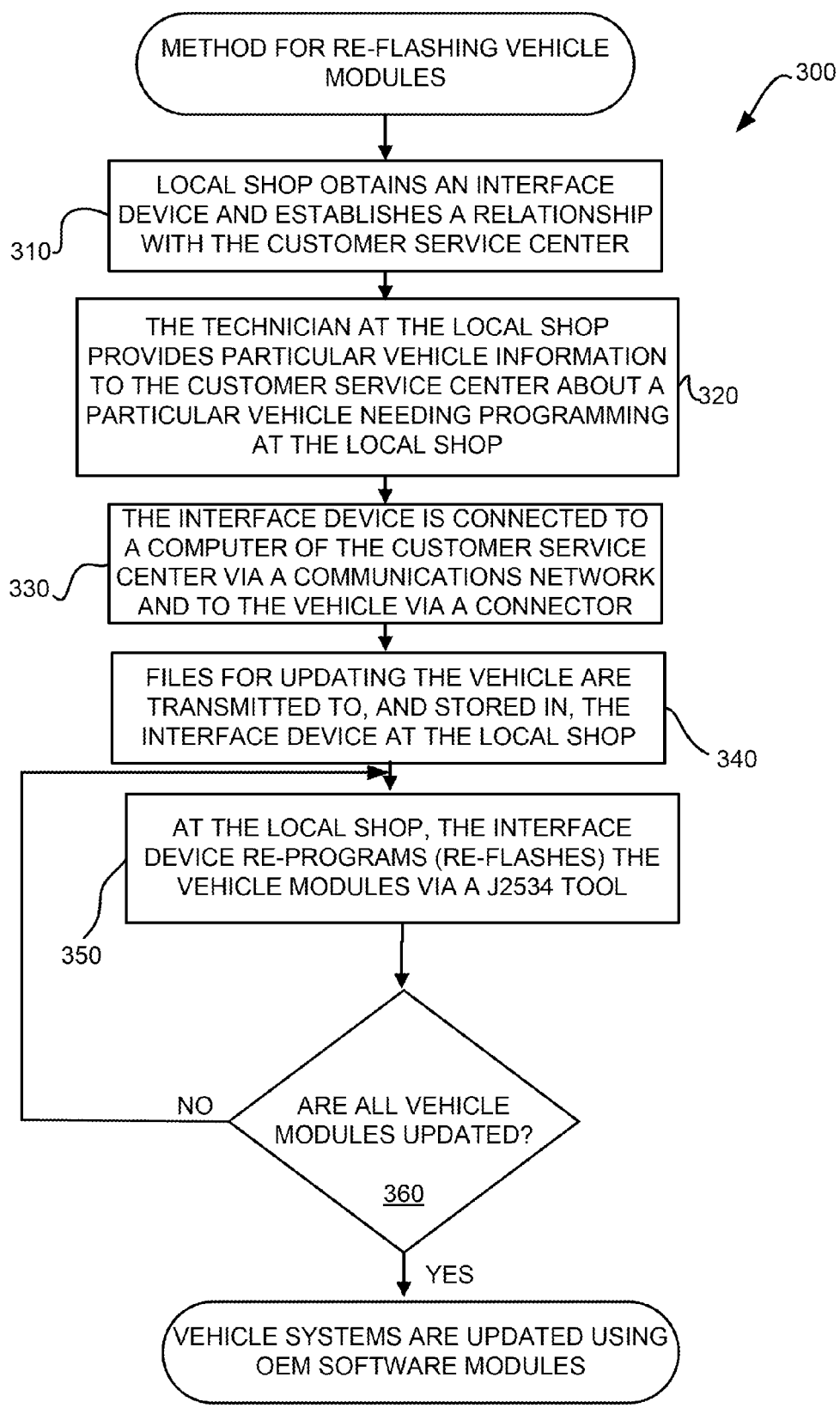
FIG. 2 is a simplified flow chart illustrating a method in accordance with one particular embodiment of the present invention.

Referring now to FIGS. 1 and 2, the instant invention provides a system 100, device 110 and method 300 that provides a small, local automotive shop 120 to have the same capability as a large dealer to program and update software for all modules in a vehicle 130, to the extent permitted by the original equipment manufacturer (OEM). According to one particular embodiment of the invention, a method is provided in which OEM software complying with Federal emissions standards is downloaded to either an interface device 110 or a PC 140 located in or around the local automotive shop 120. Such a download can occur in a known way, such as by a transfer via one or more communications networks 150. From the interface 110 or PC 140, the OEM software is transferred to a J2534 programming tool or device 160, in accordance with one particular embodiment of the present invention, so as to program the J2534 programming tool 160 for operation with a particular vehicle 130 "on-the-fly". For purposes of the instant application, the term "J2534 tool" will be used to describe a reprogramming tool configured in accordance with the SAE J2534 standard to update (re-flash) emissions related controllers, or other controllers, of a vehicle. Such a tool can be, or can include, a J2534 pass-thru device, such as is described in U.S. Pat. No. 8,638,207 to Michael Drew, et al., that patent incorporated herein by reference, in its entirety. Additionally, for purposes of the instant application, the discussion of "modules" pertains to software modules, and not plug-and-play hardware modules added to a tool, as that term is used in the '207 patent.

In the present particular embodiment of the invention, a J2534 tool 160 is provided with an interface 110 for facilitating the programming of the J2534 tool 160. In one particular embodiment of the invention the interface 110 is a smartphone, personal digital assistant (PDA) or tablet computing device (such as, but not limited to, an IPAD®, ANDROID® computing device, or other type of computing device using an operating system, such as, but not limited to, Android, Blackberry OS, iOS, Linux, Windows, etc.) in data communication with the J2534 tool 160. Such an interface 110 includes, stored in memory therein, software executed by a processor that configures the interface 110 to communicate with both the J2534 tool 160 and with a remote location 200 to obtain the proper OEM software with which to reprogram (re-flash) outdated software modules of a particular vehicle 130. Once the J2534 tool 160 has been re-flashed to include the updated software modules for the make, model and year for the particular vehicle 130, the software modules are transferred to the vehicle's computer devices via a cable connection 165, which is, for example, an SAE J1962 diagnostic link connector or the like. The software modules thus transferred are installed in the various vehicle computer components that need to be updated.

Referring now to FIGS. 1 and 2, there will now be described a system 100 and method 300 in accordance with one particular embodiment of the invention. According to the present embodiment, a third party location or customer service center 200 located remotely and separately from the local automotive shop 120. has access to one or more databases of various OEM software updates for a variety of different years, makes and models of vehicle. For example, a server 210 at the center 200 can access a database 220 of accumulated OEM software updates from a plurality of different vehicle manufacturers. It is envisioned that the database 220 is housed in a non-transitory storage device, such as a hard drive or other non-transitory storage medium disposed locally to the center 200 and/or accessible by the center 200.

Alternately, the server 210 at the center 200 can obtain vehicle information from a plurality of manufacturers (OEM1, OEM2, OEM3) via one or more communication network(s) 230, and provide an update to a requesting user 170 and/or store the update in the database 220. For exemplary purposes only, one can assume that the OEMs of FIG. 1 are different individual vehicle manufacturers, such as, but not limited to GM, Ford, Chrysler, etc. The communication network(s) 230 preferably includes an Internet connection to the Websites of OEM 1, OEM 2, OEM 3, which provide access to servers and databases of those OEMs that contain OEM software updates for particular years and models of that OEMs vehicles. However, other types of communications networks, such as, but not limited to, LAN, WLAN, telephone, mobile and/or GSM can be used as the communication networks 150, 230 without departing from the scope or spirit of the present invention.

In the present embodiment, a local automotive shop 120, located remotely from the center 200, obtains an interface device 110 that is or can be connected to, or includes as part thereof, a J2534 tool 160. Step 310. In one particular embodiment, the interface device 110, particularly configured by software to perform the functions of the present invention, is leased from the center 200. In another particular embodiment, the interface device 110 is purchased from the center 200, and a monthly or annual subscription fee is charged for the services provided by the center 200.

Among other things, the interface device 110 includes a communication device, such as a wireless modem. In one particular embodiment of the invention, as discussed above, the interface device 110 includes a tablet computing device, such an IPAD or ANDROID enabled tablet, particularly configured by software, executed by the processor of the device and stored in non-transitory memory of the device, to operate to perform the communication and updating of the present invention.

When a vehicle 130 to be updated comes into the shop 120, the local shop technician 170 communicates information about the vehicle 130 to the center 200. Step 320. This communication can occur via telephones 230, by computer request, by filling out a service request form on the interface device 110, and/or by some other type of communication. The information communicated can include, for example, the year make and model of the vehicle 130.

The interface device 110 is then connected to the server 210 at the center 200 via a communication network 150. Step 330. Preferably, the interface device 110 and server 210 are connected through the Internet using a WIFI, Internet hotspot or other type of wireless Internet connection. Please note that this is not meant to be limiting, as a wired connection may also be used without departing from the scope or spirit of the invention.

The interface device 110, which is connected to the J2534 tool 160, is also connected to a connector of the vehicle 130, for example, the ODB or ODB2 connector of the vehicle 130, via a cable 165 out from the J2534 tool 160. In one particular embodiment of the invention, the J2534 tool 160 is connected to the vehicle 130 by an SAE J1962 connector 165. Thus, the center 200 is connected to the J2534 tool 160 via the interface device 110, and the J2534 tool 160 is connected to the vehicle's on-board diagnostic computer via a connector 165.

In this configuration, the center 200 will remotely access the interface device 110 (which is local to the vehicle 130) and send files to the interface device 110, either from a database of the center 200, or from the OEM websites/databases of OEM1, OEM2 or OEM3. Step 340. This transferred software will be stored in non-transitory memory of the interface device 110 and programming executed on the interface device 110 will cause the interface device 110 to perform programming of the vehicle systems locally (i.e., at shop 120) through the J2534 tool 160, until all vehicle modules have been updated with the modules stored in the interface device 110. Steps 350 and 360. After transferring the software modules from the interface device 110 to the vehicle 130, via the J2534 tool 160 and connector 165, the updating of the vehicle 130 is complete.

Thus, the instant invention updates the module software by obtaining the modules from the center 200 and storing the updates in the interface device 110. From there, the interface device 110 updates module software in the vehicle 130. In particular, personnel 240 of the center 200 and/or the server 210 can communicate remotely with (i.e., remote into) the interface device 110 to send files to the interface device 110 from the database 220 of the center 200 and/or from OEM1, OEM2 and/or OEM3. The interface device 110 then locally performs the re-programming (re-flashing) of the vehicle modules of the vehicle 130 through the J2534 tool 160. As indicated above, the J2534 tool 160 can be a pass-through tool. Using the system of the present invention, the interface device 110, having the updates stored therein by the center 200, can program, re-program and/or update any, or all, modules that the J2534 protocol interface module allows.

Figure 3:
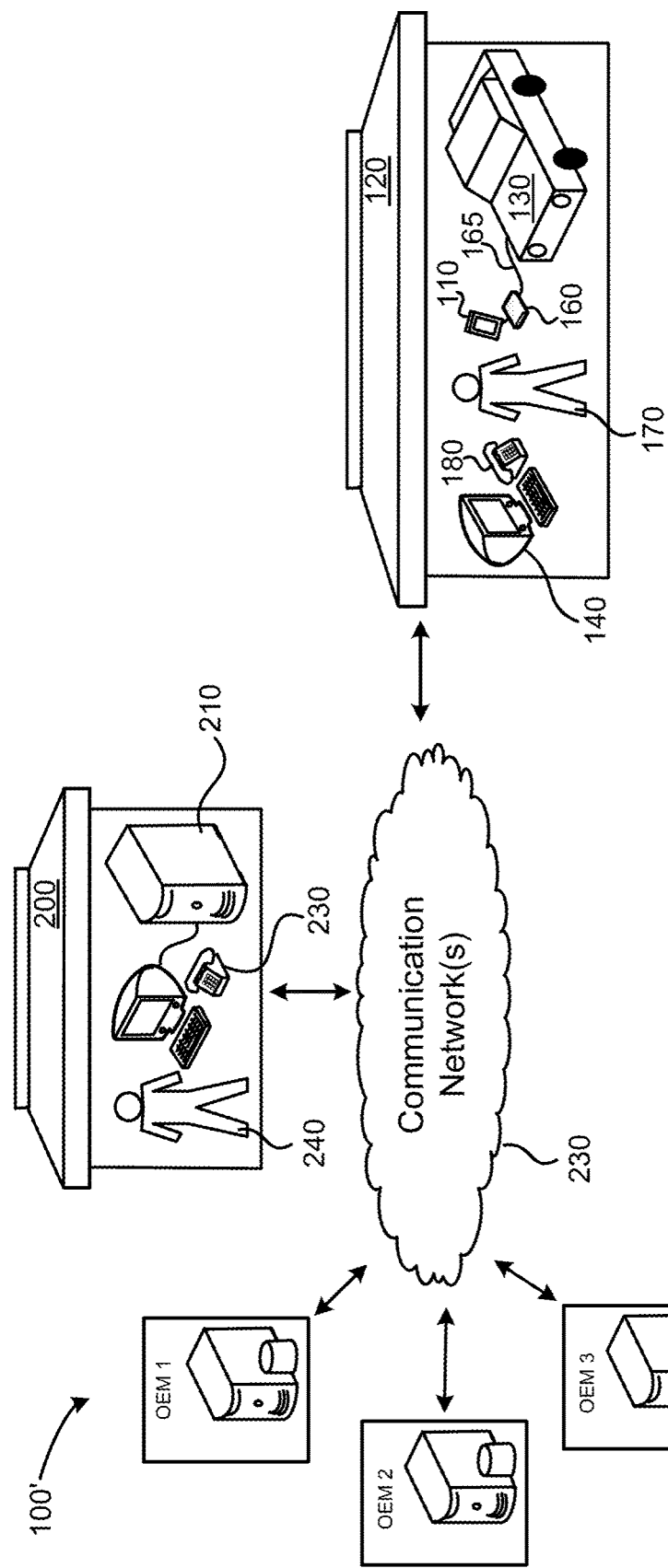
FIG. 3 is a simplified block diagram of a system in accordance with another particular embodiment of the invention

Referring now to FIG. 3, there is shown another embodiment of the present invention, wherein like reference numbers refer to like or identical components. The system 100' of FIG. 3 differs from the system 100 of FIG. 1 primarily in that the center 200 does not include the database 220, but rather, center 200 facilitates the transfer of software modules and updates directly from each of the OEMs OEM1, OEM2 and/or OEM3 to the interface device 110, via one or more communications networks 230. Thus, the local shop 120 still leases or subscribes to the services of the center 200, however, the center 200 itself, is operating as a pass-through to ensure that the proper software updates for the particular vehicle 130 are obtained from the correct OEM and stored in the interface device 110. Thus, the user 170 communicates only with the center 200, and need not communicate individually with each of OEM1, OEM2 and OEM3. This greatly simplifies the task of the local shop technician 170 and additionally reduces the number of subscriptions necessary to obtain updates from multiple vehicle manufacturers.

Accordingly, while a preferred embodiment of the present invention is shown and described herein, it will be understood that the invention may be embodied otherwise than as herein specifically illustrated or described, and that within the embodiments certain changes in the detail and construction, as well as the arrangement of the parts, may be made without departing from the principles of the present invention as defined by the appended claims.

We claim:

1. A method for programming a vehicle, comprising the steps of:
   receiving, at a first location, from a second location remote from the first location, information of a particular vehicle to be updated at the remote second location;
   facilitating, from the first location, a transfer of at least one software module particular to the vehicle to be updated from a plurality of software modules of a plurality of different vehicle manufacturers disposed in a plurality of different vehicle manufacturer original equipment manufacturer (OEM) databases accessible by the first location via a communications network or networks, said plurality of different vehicle manufacturer OEM databases being remote from said first and second locations; and
   transferring the at least one software module directly from one of the OEM databases of one of the different vehicle manufacturers to an interface device at the second location connected to the vehicle via a cable, the transfer being initiated from the first location, the interface device configured to store the at least one software module in non-transitory memory of the interface device at the second location and to use the at least one software module to program, reprogram or update at least one software module of the vehicle, via a vehicle programming tool at the second location.

2. The method of claim 1, wherein the vehicle programming tool is a J2534 programming tool and the interface device is part of, or in communication with, the J2534 programming tool.

3. The method of claim 2, wherein the J2534 programming tool is a J2534 pass-thru device.

4. The method of claim 2, wherein the interface device is a smartphone, personal digital assistant (PDA) or tablet computing device electrically connected with the J2534 programming tool.

5. The method of claim 1, wherein the interface device is configured to communicate with the vehicle programming tool and the remote location to obtain software with which to reprogram or re-flash the vehicle programming tool to update software modules of the particular vehicle.

6. The method of claim 1, wherein the first location is a third party location or customer service center having access to the remote OEM databases of the different vehicle manufacturers.

7. The method of claim 6, further comprising the step of providing at least one of the interface device and access to the at least one database to the second location on a leased or subscription basis.

8. The method of claim 1, wherein the information received about the particular vehicle is received verbally from the second location.

9. The method of claim 1, wherein the information received about the particular vehicle is received digitally from an electronic device at the second location.

10. A device for programming a vehicle at the same location as the device, comprising:
    an interface device including a communication device, the interface device particularly configured by software stored in non-transitory memory of the interface device and executed by a processor of the interface device, to communicate with a first location remote from the interface device and with a plurality of different vehicle manufacturer original equipment manufacturer (OEM) databases remote from the first location and the interface device, to obtain at least one software module used to reprogram the vehicle, said communication device configured to receive the at least one software module directly from one of said plurality of different vehicle manufacturer OEM databases at the initiation of said first location and to store said at least one software module in the non-transitory memory of the interface device;

said interface device being located at the vehicle and connected to the vehicle via a cable, said interface device additionally being local to, and in signal communication with, a vehicle programming tool configured to communicate with an on-board computer of the vehicle, said interface device further configured to update module software in the vehicle using said at least one software module stored in the interface device, via the vehicle programming tool.

11. A method for programming a vehicle, comprising the steps of:
providing a device according to claim 10;
providing information about a particular vehicle local to the device to a first location remote from the device and particular vehicle;
receiving, based on the information provided and initiated by said first location, at least one software module directly from one of a plurality of different vehicle manufacturer OEM databases remote from the device and from the said first location, the at least one software module being stored in non-transitory memory of the interface device; and
executing software on the interface device to program the particular vehicle using the at least one software module via the vehicle programming tool.

12. The method of claim 11, wherein the information about a particular vehicle is provided to the first location orally.

13. The method of claim 11, wherein the information about a particular vehicle is provided to the first location digitally.

14. A system for re-programming software modules of a vehicle, comprising:
a customer service center;
a vehicle programming device disposed local to the vehicle and remote from the customer service center;
a plurality of different vehicle manufacturer original equipment manufacturer (OEM) databases remote from the customer service center and the vehicle programming device;
an interface device located at the vehicle and remote from the customer service center and connected to the vehicle via a cable, said interface device electrically connected to, or part of, said vehicle programming device;
said interface device including a communication device for communicating with said customer service center over a communications network and with the plurality of different vehicle manufacturer OEM databases to receive at least one software module, said at least one software module being received directly from one of said plurality of different vehicle manufacturer OEM databases at the initiation of said customer service center and stored in non-transitory memory of the interface device; and
said interface device configured to update at least one software module of the vehicle with the at least one software module stored in the interface device using the vehicle programming tool.

* * * * *